United States Patent [19]
Le et al.

[11] Patent Number: 6,145,089
[45] Date of Patent: Nov. 7, 2000

[54] SERVER FAIL-OVER SYSTEM

[75] Inventors: Hung Le, San Francisco; Gil Tene, Belmont, both of Calif.

[73] Assignee: Legato Systems, Inc., Mountain View, Calif.

[21] Appl. No.: 08/966,633

[22] Filed: Nov. 10, 1997

[51] Int. Cl.[7] .................................................. G06F 11/00
[52] U.S. Cl. ................................................................ 714/4
[58] Field of Search ............................... 714/15, 16, 3, 714/4, 6, 13

[56] References Cited

U.S. PATENT DOCUMENTS

| | | | |
|---|---|---|---|
| 5,434,994 | 7/1995 | Shaheen et al. | 395/500 |
| 5,513,314 | 4/1996 | Kandasamy et al. | 714/6 |
| 5,566,297 | 10/1996 | Devarakonda et al. | 714/15 |
| 5,696,895 | 12/1997 | Hemphill et al. | 714/4 |
| 5,774,640 | 6/1998 | Kurio | 714/4 |
| 5,852,724 | 12/1998 | Glenn, II et al. | 714/7 |

*Primary Examiner*—Robert W. Beausoliel, Jr.
*Assistant Examiner*—Pierre E. Elisca
*Attorney, Agent, or Firm*—Workman, Nydegger & Seeley

[57] ABSTRACT

A method and apparatus for a server fail-over system is provided. The fail-over system includes a plurality of servers for providing a plurality of services. Each server may provide more than one service. The plurality of servers includes a first server for providing a first service, the system further including a client for consuming the plurality of services, including the first service. A network connects the client to the plurality of servers. If the first server fails to provide the first service, the first service fails over to a second server of the plurality of servers, the second server of the plurality of servers being the highest priority server for providing the first service in the event of failure of the first server.

28 Claims, 9 Drawing Sheets

SERVER FAIL-OVER SYSTEM

FIELD OF THE INVENTION

The present invention relates to networked systems and, more specifically, to high availability networked computer systems.

BACKGROUND OF THE INVENTION

In more and more computer systems, processes are divided between servers and clients. Servers provide services accessible to clients. In many cases, clients need high availability in these services.

One prior art technique for implementing server and client processes is to have multiple servers each of which provides a single service. In this way, when one server goes down, other services remain available. However, if a server supporting a service goes down, the service becomes unavailable to the clients.

An alternative prior art technique for implementing server and client processes is to have multiple servers each of which has a copy of each of the available services. The first server provides the services initially. If the first server fails, a second server can take over providing all of the services. However, this requires extensive redundancy, which is costly.

Therefore, what is needed is a method for implementing a high availability service process which provides services without requiring duplication of services.

SUMMARY OF THE INVENTION

One embodiment of the present invention provides a high availability multiple server fail-over system. The fail-over system comprises a plurality of servers for providing a plurality of services. Each server may provide more than one service. The plurality of servers includes a first server for providing a first service. The system further includes at least one client for consuming the plurality of services, including the first service. A network connects the client to the plurality of servers. If the first server fails to provide the first service, the first service fails over to a second server of the plurality of servers, the second server of the plurality of servers being the highest priority server for providing the first service in the event of failure of the first server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus in accordance with the present invention for a fail-over system for a server and client process is described below. In the following description, for the purposes of explanation, numerous specific details are set forth in order to provide a thorough understanding of the server fail-over system of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
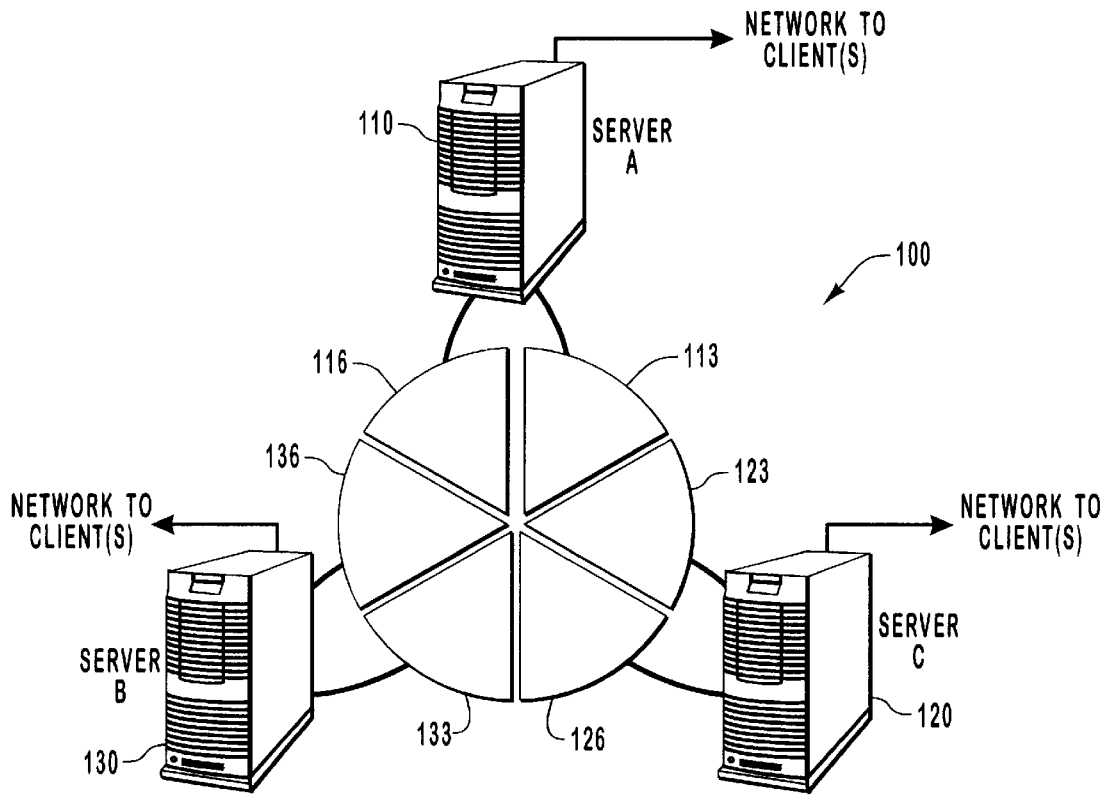
FIG. 1A is a block diagram of servers supporting services.

FIG. 1A is a block diagram illustrating one embodiment of a plurality of servers supporting services or groups of services in a first configuration 100. Server A 110 supports service groups provided by an intranet web server 116 and a network file service (NFS) server 113. Server B 130 supports a first database 136 and customer support software 133. Server C 120 supports an internet web server 123 and a second database 126. It is to be understood that the specific services or service groups are merely examples, and that a service group can include such groups as an intranet web server, first database, customer support software, second database, internet web server, network file server (NFS), or any other service. These service groups provide access to various data for a client (not shown) connected to a network supported by server A 110, server B 130, and server C 120.

Figure 1B:
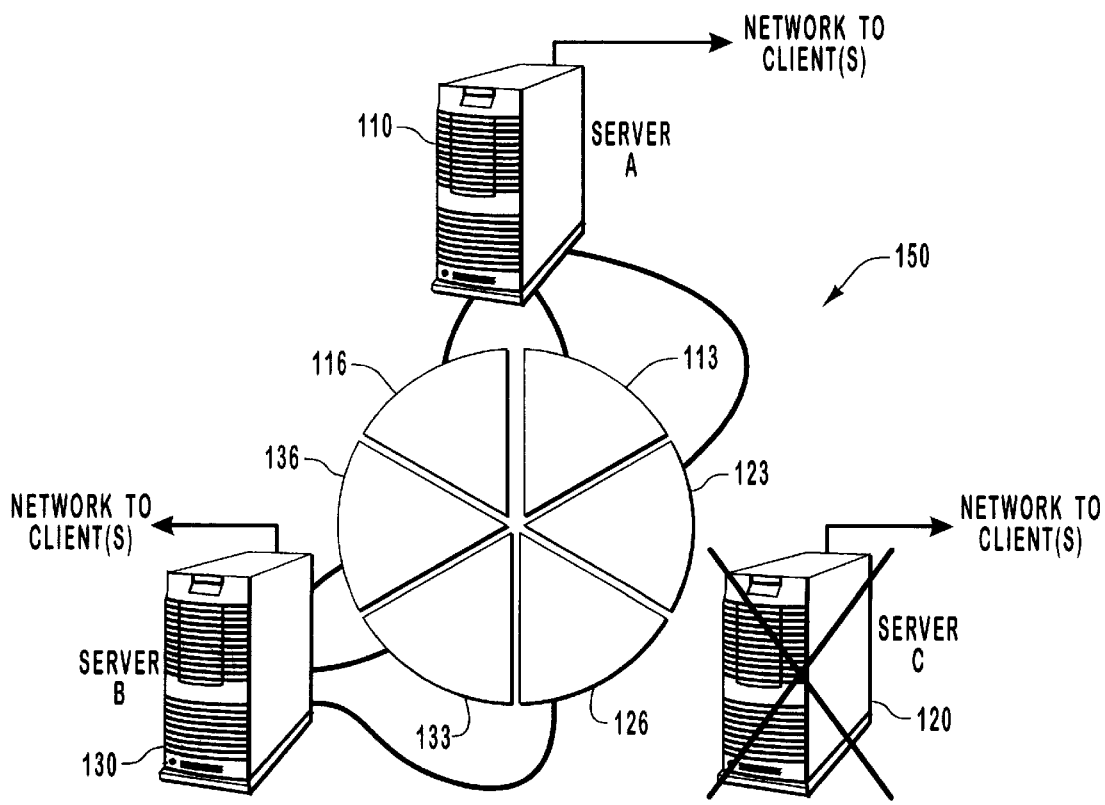
FIG. 1B is a block diagram illustrating the servers shown in FIG. 1A in accordance with one embodiment of the invention after one of the servers fails.

FIG. 1B is a block diagram illustrating one embodiment of the reconfigured servers of FIG. 1A in a second configuration 150. Failed server C 120 is no longer accessible to the client (not shown) connected to the network supported by server A 110, server B 130, and previously server C 120. Because of this, without reconfiguration, the client could no longer access the internet web server 123 and second database 126. However, the reconfiguration according to one embodiment of the present invention is as follows. Since server A 110 remains functional, it continues to support the intranet web server 116 and NFS server 113. In addition, server A 110 supports internet web server 123. Selecting whether server A 110 or server B 130 will support internet web server 123 depends on the priorities of server A 110 and server B 130 and is determined by an election process. In this example, server A 110 has higher priority than server B 130 with respect to the internet web server 123 service. The election process is described in more detail below. Similarly, server B 130 continues to support the first database 136 and customer support software 133. Furthermore, as server B 130 has higher priority with respect to second database 126 formerly supported by server C 120, server B 130 also supports second database 126. It is to be understood that this is only one example of how such service groups may be redistributed. The actual redistribution is based on the priority of the available servers established by the election process described in more detail below.

Figure 2:
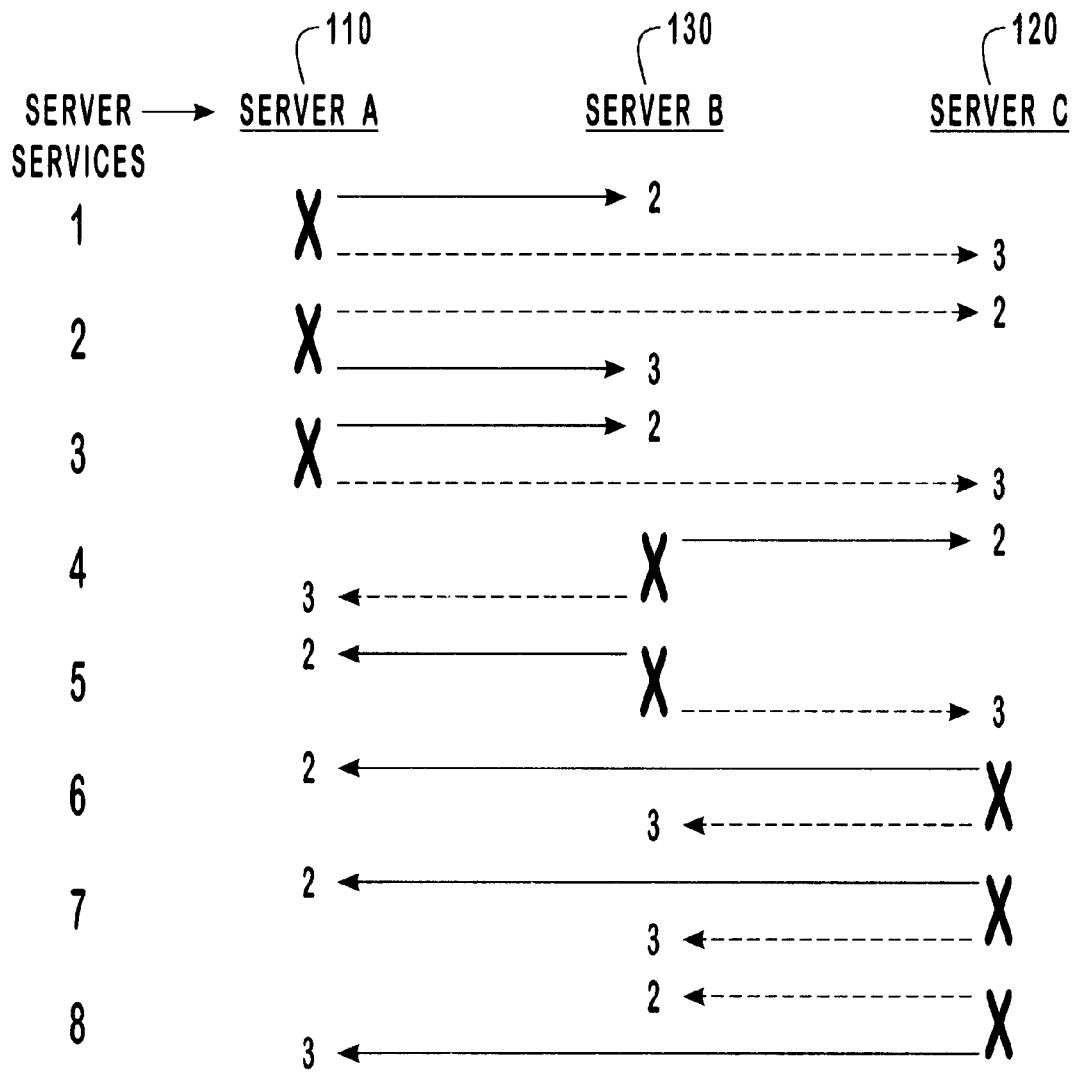
FIG. 2 is a service fail-over overview diagram in accordance with one embodiment of the invention.

FIG. 2 is an illustration of one embodiment of a service fail-over overview diagram. The diagram includes three columns corresponding to three servers, server A 110, server B 130, and server C 120. The diagram further includes eight rows corresponding to eight services or service groups provided by the servers. The services or service groups are numbered 1 through 8. The X's indicate the original server which provides the service or service group. Thus, services 1–3 are provided by server A 110, services 4–5 are provided by server B 130, and services 6–8 are provided by server C 120. Each solid arrow indicates the first server to which the service fails. Thus, for service 1, if server A 110 cannot provide the service, service 1 fails first to server B 130. This is indicated by a solid line with an arrow, pointing to a 2, indicating that server B 130 is the second server which can provide service 1. Each dashed line, pointing to a 3, indicates the third server which can provide the service. Thus, for example, if both server A 110 and server B 130 fail, service 1 fails-over to server C 120. As can be seen from the diagram, a service or service group provided by the original server does not necessarily fail over to the same server. Thus, for example, although service 1 and service 2 are both initially provided by server A 110, if server A 110 fails, service 1 fails initially to server B 130, and service 2 fails initially to server C 120. The process of determining to which server each service or service group fails is accomplished using the process described below with respect to FIG. 6 and FIG. 9. This process can be simply expanded for more servers.

Figure 3:
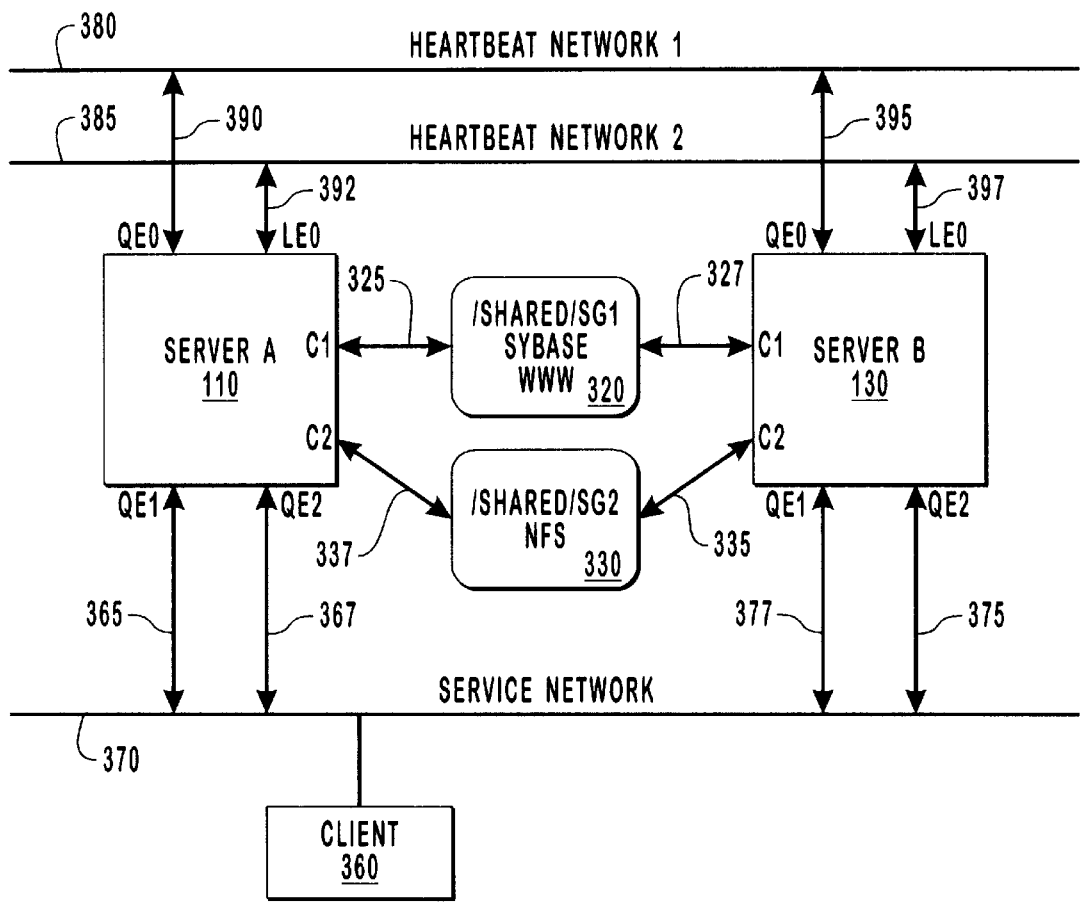
FIG. 3 is a block diagram illustrating one embodiment of the system configuration of the present invention.

FIG. 3 is a block diagram illustrating one embodiment of the system configuration of the present invention. The server A 110 and server B 130 provide services to a client 360. The server A 110 is coupled to a first service group 320 via a primary service connection 325. The first service group 320 may provide a variety of services. For example, server A 110 may initially provide a SYBASE database as shown, or an Oracle database, and a worldwide web database. SYBASE is a trademark of Sybase Corporation. Similarly, server B 130 is coupled via a primary service connection 335 to a second service group 330. For one embodiment, server B 130 may provide a network file server (NFS) database.

The primary service connection 325 between server A 110 and first service group 320 may fail as a result of server A 110 failing or connection 325 failing. If connection 325 fails, a secondary service connection 327, coupling first service group 320 to server B 130, is initiated. In this way, if server A 110 or connection 325 fails, first service group 320 is failed over to server B 130. The fail-over process is discussed in more detail below. Similarly, if primary service connection 335 between server B 130 and second service group 330 fails, a secondary service connection 337 couples second service group 330 to server A 110. In this way, both service groups available to client 360 even if one of the servers 110, 130 usually providing the service group 320, 330 fails. Although only two service groups 320, 330 are illustrated in FIG. 3, it will be understood that more than one service group 320, 330 or other service may be supported by each server 110, 130. Similarly, more than two servers may be supported by the present invention.

The server A 110 and server B 130 are coupled to a service network 370. The service network 370 is used to couple servers 110, 130 to client 360. Although only one client 360 is illustrated, multiple clients 360 may be coupled to service network 370. For one embodiment, service network 370 may be an internet connection between the client 360 and servers 110, 130. A first, or primary, connection 365 connects server A 110 to service network 370. However, if first connection 365 fails, a secondary, or backup, connection 367 may be initiated. The secondary connection 367 is not connected if first connection 365 is functioning. Similarly, server B 130 has a primary connection 375 and a backup connection 377 to service network 370.

The server A 110 and server B 130 are also connected to a first heartbeat network 380 and a second heartbeat network 385. The server A 110 is connected to first heartbeat network 380 by a first connection 390. However, if either the first heartbeat network 380 or connection 390 fails, there is a second connection 392 to second heartbeat network 385. Similarly, for server B 130, a primary connection 395 to first heartbeat network 380 is replaced by a secondary connection 397 if either the first heartbeat network 380 or primary connection 395 fails. The heartbeat networks 380, 385 connect together server A 110 and server B 130. The heartbeat networks 380, 385 function to inform server A 110 and server B 130 if any server on heartbeat networks 380, 385 fails.

Figure 4:
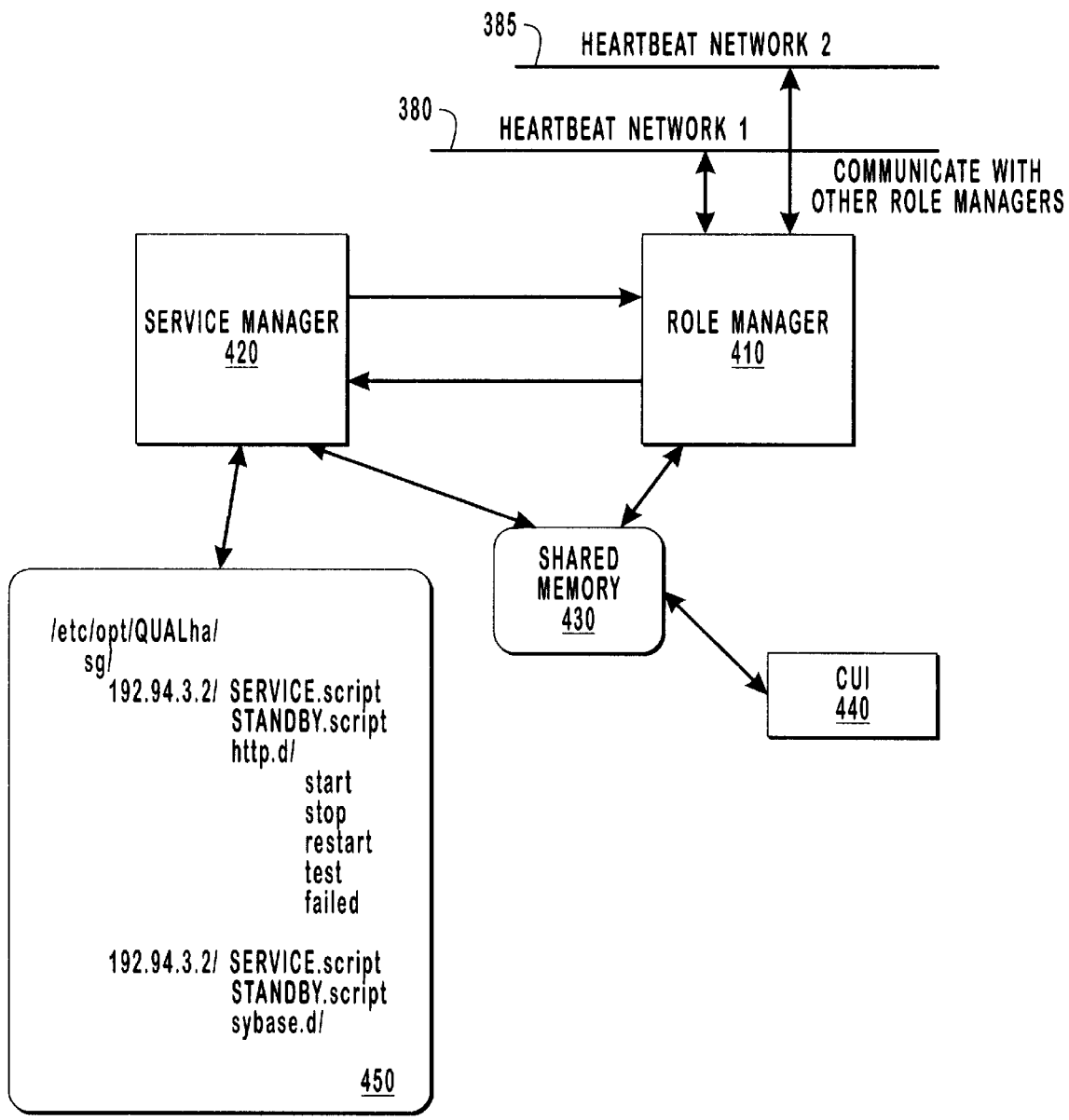
FIG. 4 is a block diagram illustrating one embodiment of the relationship between the components within one server of the present invention.

FIG. 4 is a block diagram illustrating the relationship between the components within one server of one embodiment of the present invention. A role manager 410 is coupled to first heartbeat network 380 and second heartbeat network 385. The role manager 410 runs continuously on each server 110, 130 shown in FIG. 3 and is responsible for the communication between servers 110, 130. The role manager 410 is also responsible for managing the distribution of service groups 320, 330 shown in FIG. 3 between servers. The role manager 410 receives a heartbeat from heartbeat networks 380, 385 and broadcasts the heartbeat message of its server. The heartbeat is a timing signal. The heartbeat message broadcast by role manager 410 includes information about the server associated with role manager 410. For one embodiment, the heartbeat message of each server states the server status and server availability. The role manager 410 also receives heartbeat messages from other servers. When no heartbeat message is received from a server for a period of time, a disruption in the communication with the server is indicated. In response to such a disruption, an election process is triggered for each service or service group associated with the server. The election process is described in more detail below with respect to FIGS. 6 and 9.

When a server is elected to support a service or service group, role manager 410 of the server directs a service manager 420 to provide the service or services associated with that service group. In one embodiment, service manager 420 runs script files 450 of the service or service group associated with the associated server to acquire and release service resources. The script files 450 may contain scripts to start, stop, and restart a service or services within the service group. The script file 450 may also include a response to a service failure. A control user interface (CUI) 440 provides a user interface. The CUI 440 permits a user to monitor and modify the status of the server. A shared memory 430 is accessed by the service manager 420, role manager 410, and CUI 440. The shared memory 430 contains the programs associated with each component of the server.

Figure 5:
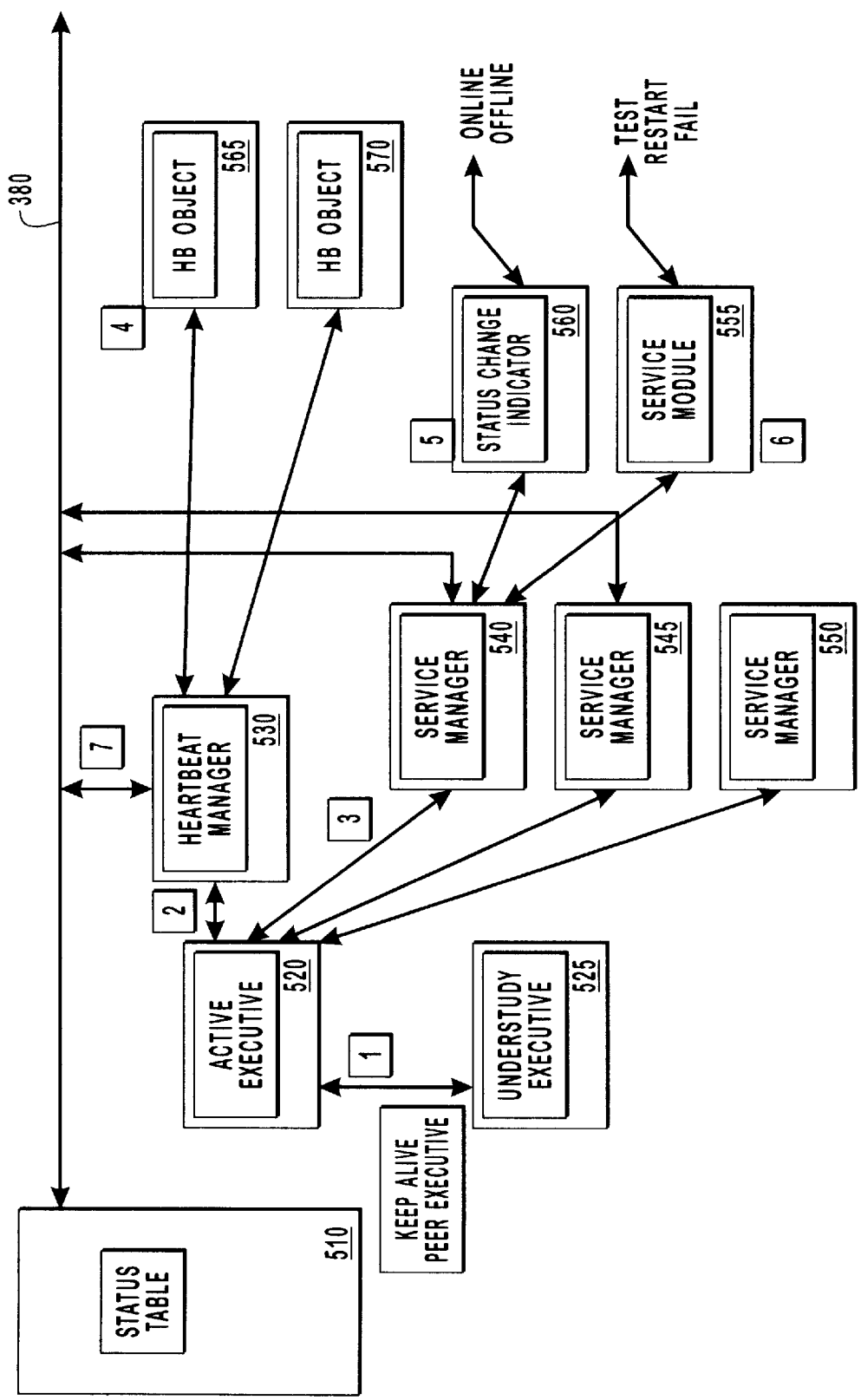
FIG. 5 is an illustration of one embodiment of the kernel of the present invention.

FIG. 5 is an illustration of one embodiment of a kernel 500 of the present invention. The kernel 500 manages the services or service groups to provide a foundation where services in a client-server environment are highly available. The kernel 500 also uses the heartbeat to monitor members of the service groups and ensures that there is only one member of any service group in a service state. The service state means that the service is currently providing service to client 360 shown in FIG. 3.

The kernel 500 includes a status table 510 which maintains information about each service or service group. For one embodiment, status table 510 includes the heartbeat information and status of each service or service group. The status table 510 may also include information about kernel 500. Only a heartbeat manager 530 and service managers 540, 545, 550 can read from and write to status table 510.

The kernel 500 further includes an active executive 520. The active executive 520 manages the functionality of kernel 500. The active executive 520 keeps heartbeat manager 530 alive. If heartbeat manager 530 is detected as being down by active executive 520, a new instance of heartbeat manager 530 is started. For one embodiment, starting a new instance of heartbeat manager 530 does not interrupt the connection between heartbeat manager 530 and heartbeat objects 565, 570. The active executive 520 further keeps service managers 540, 545, 550 alive and starts a new instance of a service manager 540, 545, 550 if the service manager 540, 545, 550 is detected as being down. The active executive 520 further manages the state transition of each service or service group from a standby state to the service state, or service state to standby state, by looking up the current heartbeat information and the status of service group members in status table 510.

The active executive 520 is coupled to a passive executive, or understudy executive, 525. The active executive 520 and standby executive 525 can monitor each other. If one of the executives 520, 525 dies, the other detects this event. For one embodiment, standby executive 525 is a child of active executive 520. If standby executive 525 dies, active executive 520 starts a new instance of standby executive 525. If active executive 520 dies, standby executive 525 promotes itself to be the new active executive, and spawns a new standby executive. In this way, executives 520, 525 are fully redundant.

The heartbeat manager 530 obtains the heartbeat and status of remote systems from its heartbeat objects (HBOs) 565, 570. The heartbeat manager 530 keeps heartbeat objects 565, 570 alive and generates new instances of the heartbeat object 565, 570 if one fails. For one embodiment, there is a heartbeat object 565, 570 for each server in the system. The heartbeat manager 530 further sends heartbeat and local status information to remote systems. For one embodiment, this is accomplished by heartbeat objects 565, 570. The heartbeat manager 530 receives status information about remote systems and updates status table 510 with this information. The heartbeat manager 530 may further have an authenticity verification mechanism by which it determines whether or not the information is originating from a reliable source. For one embodiment, heartbeat manager 530 verifies by implementing encryption or other authentication techniques.

For one embodiment, heartbeat manager 530 supports two to eight heartbeat objects 565, 570. The heartbeat objects 565, 570 may be configured for any type of heartbeat signal, permitting use of the system in a heterogeneous environment. The types of heartbeat that heartbeat manager 530 may receive include serial, Ethernet, protocol, internet protocol, proprietary, or any other signal indicating the active state of remote systems.

The kernel 500 further includes service managers 540, 545, 550. Each of the service managers 540, 545, 550 keeps the service or services associated with the service group alive. The service managers 540, 545, 550 further manage the transition scripts, moving each service or service group from standby state to service state, and from service state to standby state. The service managers 540, 545, 550 also indicate to a service module 555 that service module 555 should test or re-start its services. The service managers 540, 545, 550 further mark a service as down and perform a failure procedure for the service, if the service is not available. For one embodiment, these processes are performed asynchronously. This is described in more detail below with respect to FIG. 7.

An instance of a service manager 540, 545, 550 is initiated by active executive 520. If the service manager 540, 545, 550 fails, active executive 520 initiates a new instance of the service manager 540, 545, 550. Each of the service managers 540, 545, 550 is an independent process that provides a service to service module 555. A state change indicator 560 is coupled to service managers 540, 545, 550. Changes in the state of service managers 540, 545, 550 are indicated by state change indicator 560. Such a state change may occur when a service manager 540, 545, 550 becomes the service provider for a service or service group. This occurs when the original service manager 540, 545, 550 fails. Another state change indicated by state change indicator 560 is the change of a service manager 540, 545, 550 from a provider to a non-provider status.

Figure 6:
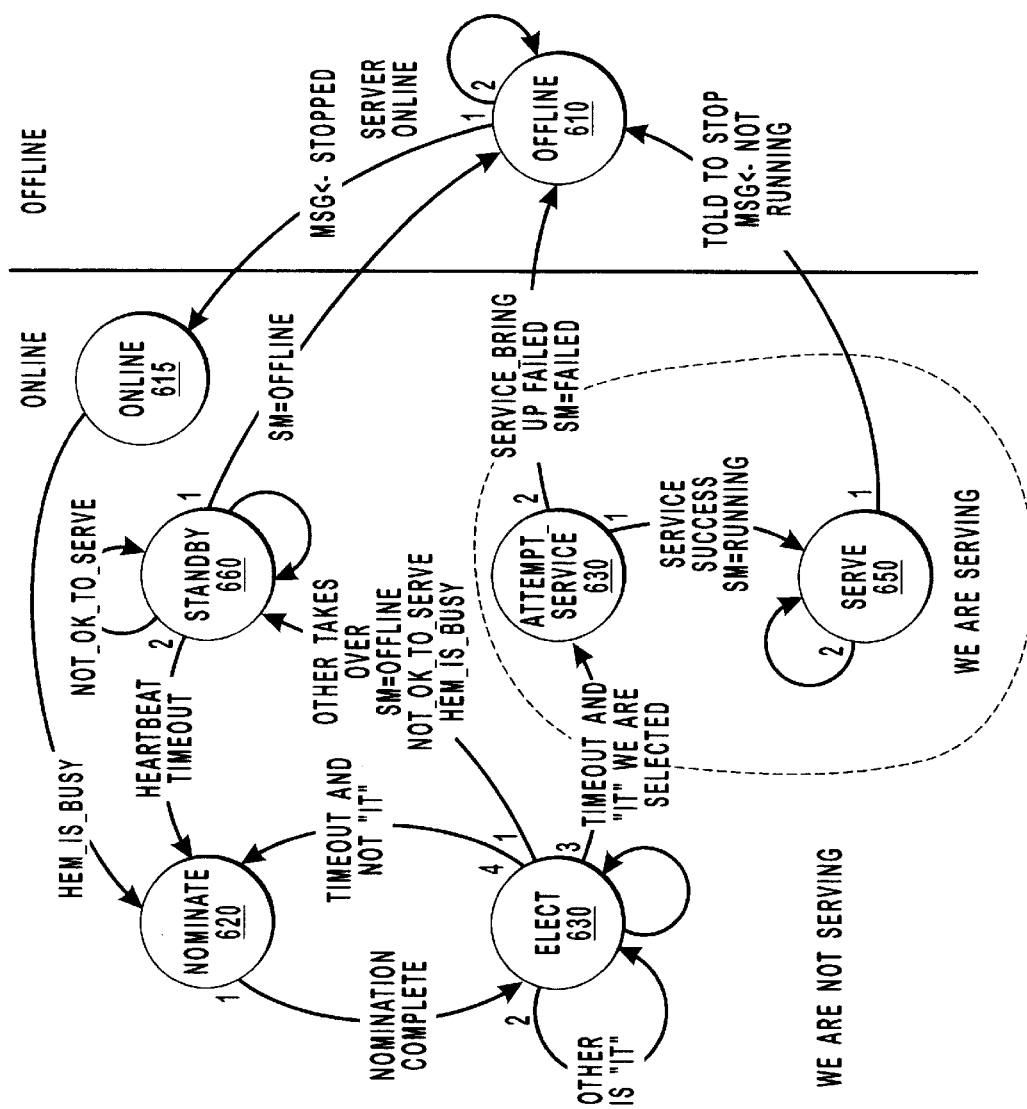
FIG. 6 is a state diagram of one embodiment of a role manager.

FIG. 6 is a state diagram of role manager 410 (RM) shown in FIG. 4 for a server. In the explanation below, the server will be referred to as Server A. The RM begins offline, in state 610. When the RM is initiated, it moves to an online state 615. Immediately, upon being in the online state 615, the RM moves to a nomination state 620.

In the nomination state 620, the RM nominates its server, server A, for each service which server A can provide. The RM has a list of services which server A can provide. The nomination process is described in more detail below with respect to FIG. 9. When the nomination state 620 is completed, and all servers have converged to a single nominee server, the RM continues to state 630, election.

The election state 630 response depends on the result of the nomination state 620. The first possible result of the nomination state 620 is a time-out on the nomination process. For one embodiment, the nomination process times out after three minutes. If there is a time-out, the process returns to the nomination state 620, and the nomination process is re-initiated.

A second possible result is that another server is already providing the service. In this case, the RM need not provide the service, and the process continues to state 660, standby. In the standby state 660, the RM waits and monitors the heartbeat of the server which was selected to provide the service. If the heartbeat of the service provider fails, the RM transitions to the nomination state 620, and nominates server A to provide the service. In the standby state 660, if the service manager for server A goes offline, the RM goes to the offline state 610 as well.

A third possible result is that the RM is unable to provide the service. A ser, or the system, may set the system such that the RM cannot provide certain services. This may be useful, for example, if server A has a faulty drive. In this instance, the process continues to the standby state 660.

A fourth possible result is that server A is selected as the server which will provide the service. In this instance, the process continues to state 640, attempt service. In the attempt service state 640, the RM commands the associated service manager (SM) to provide the service. If the service attempt by the SM is successful, the process continues to the service state 650, and the SM provides the service.

In the service state 650, the SM provides the service. A command to go offline may interrupt this service and move the RM to state 610, offline. The command to go offline may come from the user, or from the SM, if the SM has failed during the process.

Figure 7:
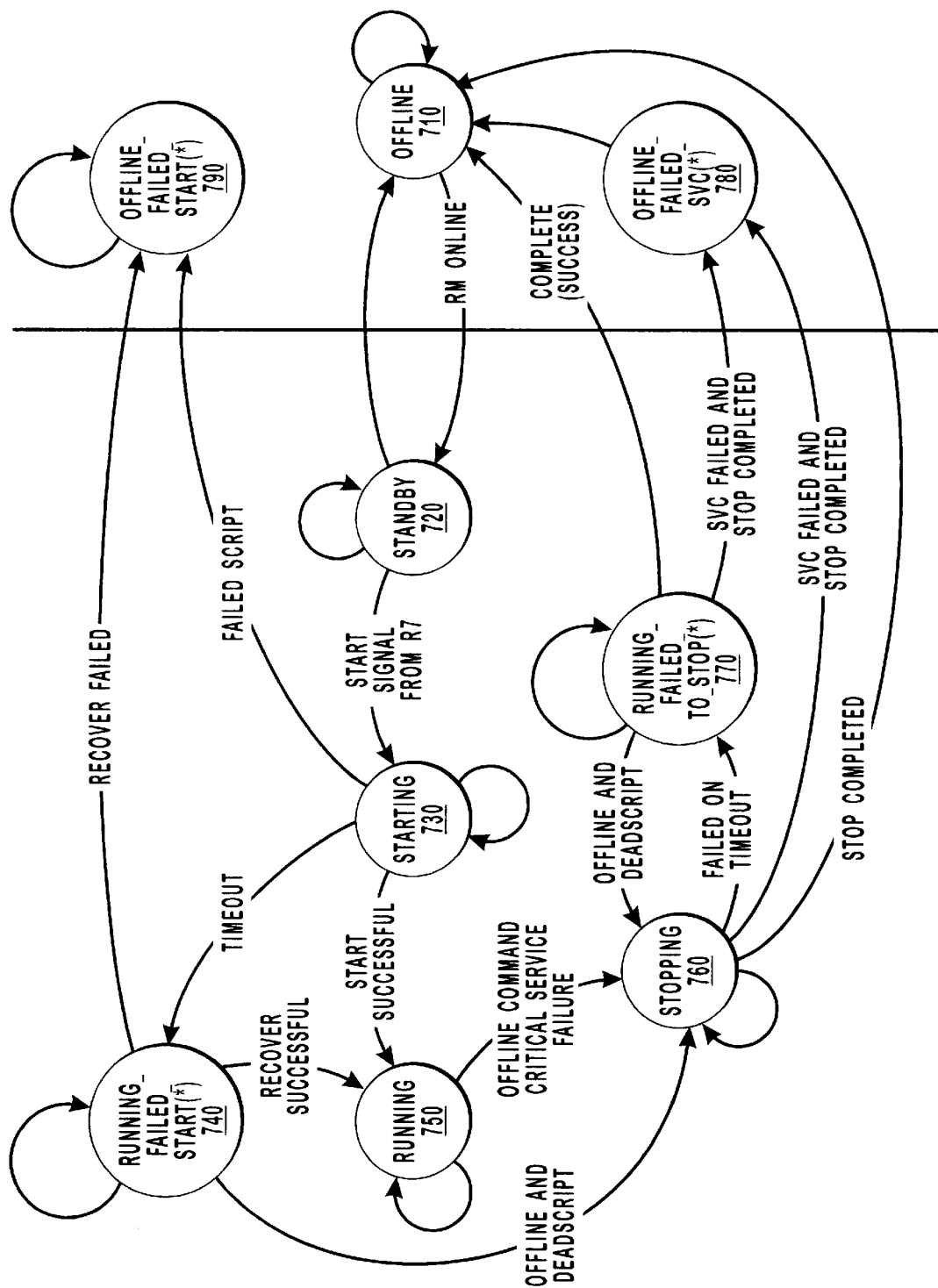
FIG. 7. is a state diagram of one embodiment of a service manager.

FIG. 7 illustrates one embodiment of a state diagram of the service manager (SM) of server A. The SM is initially offline, in state 710. When server A is turned on and goes online, the SM moves to the standby state 720. The SM remains in the standby state 720. When the RM commands the SM to initialize, which occurs when the RM is in the attempt service state 640 shown in FIG. 6, the SM moves to a starting state 730. In the starting state 730, the SM attempts to start the service or group of services associated with the SM. There are three possible results.

A first possible result is that the initialization fails. In this instance, the SM transitions to state 790, offline due to failure to start. This indicates to the RM, and to any other monitoring device, that the SM is offline because of a failure to start. From state 790, the SM may transition to the offline state 710 if a command is received to go offline. For one embodiment, the SM waits for the failure to be corrected prior to transitioning from the offline due to failure to start state 790 to the offline state 710.

A second possible result is that the initialization times out. In this instance, the SM transitions to state 740, failed to start. The failed to start state 740 is a self-recovery state. The SM continues trying to complete the initialization process. For one embodiment, the timer is set to three minutes. After three minutes in the starting state 730, the SM moves to the failed to start state 740.

If the self-recovery process, which is a continuation of the initialization process, fails, after a certain time, the SM transitions to the offline due to failure to start state 790. For one embodiment, this occurs after five minutes. Alternatively, if the user aborts the self-recovery process in the failed to start state 740, the SM continues to a stopping state 760. Alternatively, if the selfrecovery process is successful, the SM continues to a running state 750.

A third possible result is that the initialization is successful, and the SM moves to the running state 750. In the running state 750, the SM runs the service or service group and monitors the functioning of the service or service group.

The SM remains in the running state 750, providing services until something disrupts the service. If the RM commands the SM to go offline, the SM moves to the stopping state 760. If the SM observes a critical service failure, the SM moves to the stopping state 760 as well. If the SM observes a non-critical service failure, the SM notifies the RM of the non-critical failure, but remains in the running state 750. For one embodiment, the SM uses a non-critical failure flag to indicate to the RM that there is a non-critical failure.

In the stopping state 760, the SM attempts to abort all of the services which are running, and stop. If the stop is successful, and the stop was a result of a failed service, the SM continues to a failed service state 780. The failed service state 780 is an offline state, which indicates that the SM stopped as a result of a failed service. From the failed service state 780, a recovery command is initiated. If the recovery is successful, the SM continues to the offline state 710. If the stop is successful, and the stop was not the result of a failed service, the SM continues directly to the offline state 710.

If the stopping process fails, either on time-out or as a result of an abort command, the SM continues to the failed to stop state 770. In the failed to stop state 770, the SM continues to attempt stopping. If the SM is successful in stopping, and the stop was initiated by a failed service, the SM continues to the failed service state 780. If the SM is successful in stopping, and the stop was not the result of a failed service, the SM continues to the offline state 710.

Figure 8:
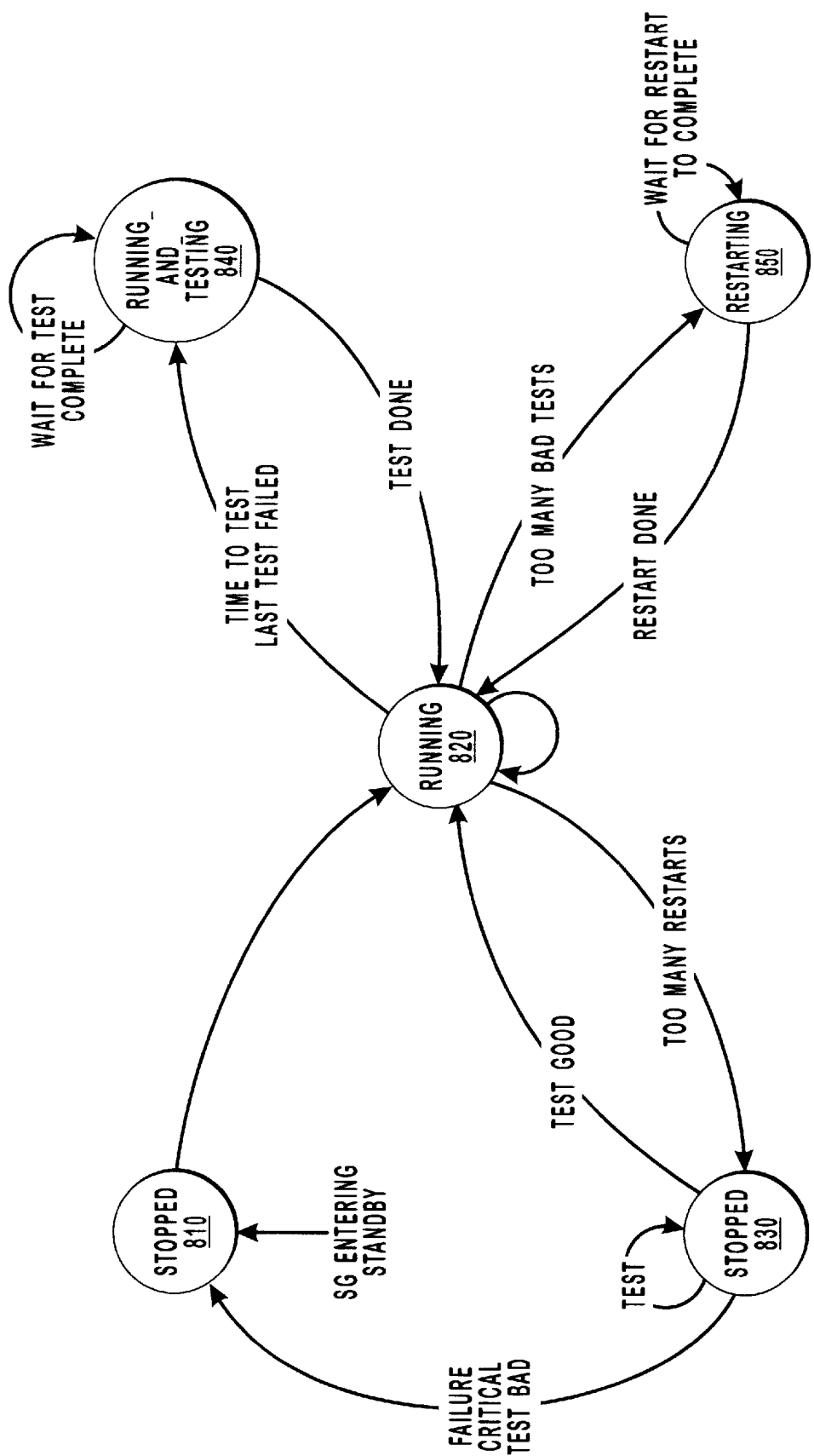
FIG. 8 is a state diagram of one embodiment of a service associated with a server.

FIG. 8 illustrates one embodiment of the state diagram of a service of the present invention. The entire state diagram of the service corresponds to the running state 750 of the SM shown in FIG. 7. The service is initially in the stopped state 810. When the SM enters the running state 750 shown in FIG. 7, the service enters the running state 820 as well. In the running state 820, the service is provided, as described above.

Periodically, in the running state 820, the service self-tests, by going to a testing state 840. In the testing state 840, the service is self-testing, while providing the service. For one embodiment, the period between tests is approximately 20 seconds. When the test is completed, the service returns from the testing state 840 to the running state 820. If the test was successful, the service remains in the running state 820. The service maintains a counter of the number of consecutive failed tests. Therefore, if the test was successful, the counter is set to zero. If the test was not successful, the service increments the number of consecutive failed tests counter, and returns to the testing state 840. If the number of failed tests reaches a predetermined number, the service moves to a restarting state 850. A predetermined number of consecutively failed tests indicates a problem. Therefore, the service is restarted. For one embodiment, the number of consecutively failed tests which prompts a restart is set to three. However, this number may be any preselected number and may be changed by the user.

At the restarting state 850, the service is restarted. The counter of consecutively failed tests is also reset to zero. When the restart process is completed, the service returns to the running state 820. The service also includes a second counter, for counting the number of restarts. When the service returns to the running state 820 after a restart, the restart counter is incremented. If the number of restarts exceeds a predetermined number, the service goes to a failed state 830. For one embodiment, the number of restarts which triggers a failed state 830 is two.

A test is run in the failed state 830 to determine whether the failure is critical or non-critical. If the failure is non-critical, a self-recovery test is run by the service. If the self-recovery test is successful, the service returns to the running state 820. If the self-recovery test is unsuccessful, the service transitions to the stopped state 810, and notifies the SM that it has failed. If the failure is determined to be critical, the service transitions to the stopped state 810, and notifies the SM that the failure is critical. For one embodiment, the notification of the SM is a flag which the service may set to no failure/failure/critical failure.

Figure 9:
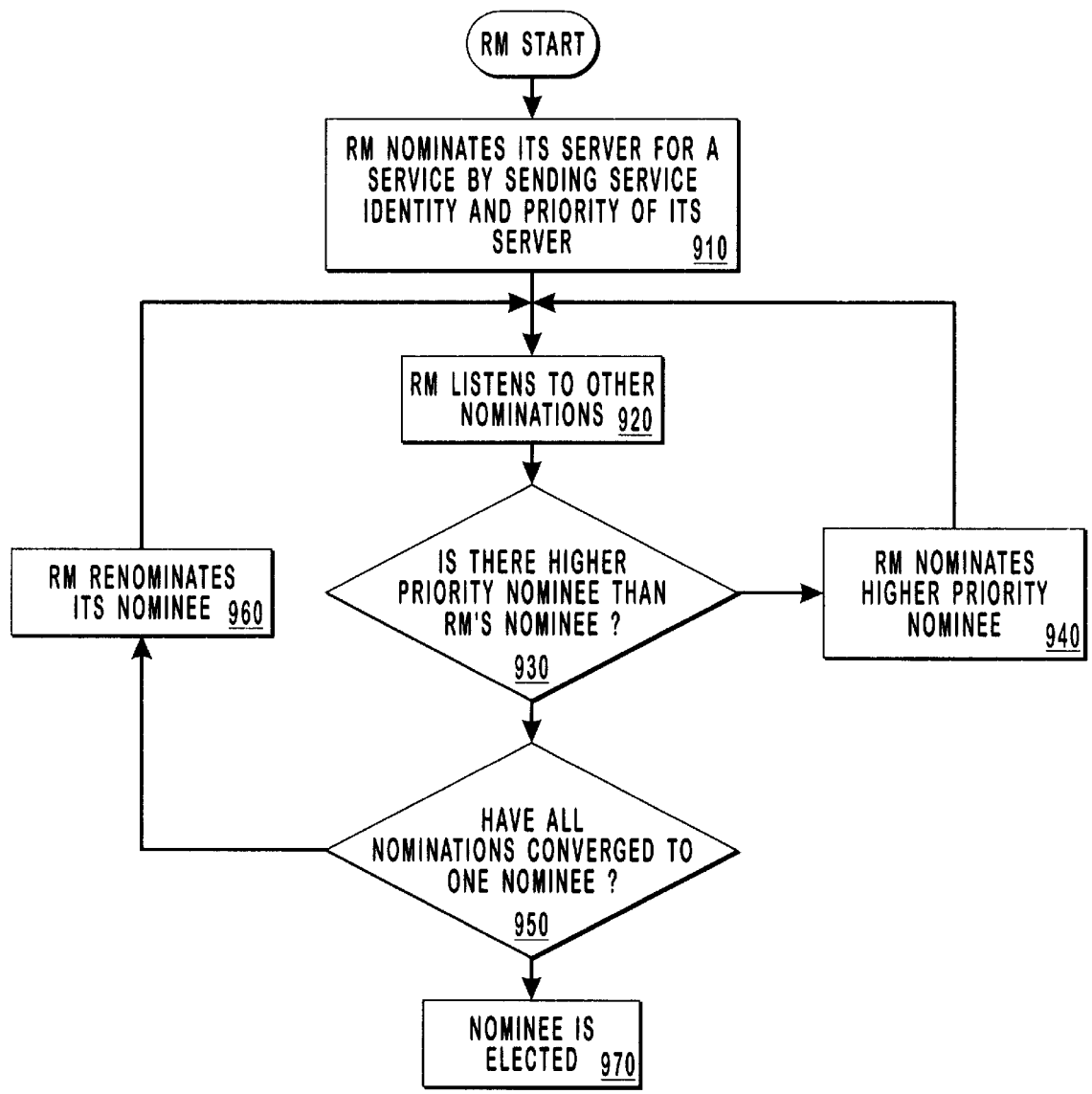
FIG. 9 is a flowchart illustrating one embodiment of a nomination and election process.

FIG. 9 is a flowchart showing one embodiment of the nomination and election process discussed above with respect to FIG. 6. The nomination process starts when the RM is started. This is the full nomination process. The process if another server is already providing the service, or if the RM is unable to provide the service, is described above with respect to FIG. 6.

At block 910, the RM nominates its server. Nomination consists of the RM indicating that its server could provide the service in question. Nomination, for one embodiment, includes sending out the service identifier and the priority of the server. Each server has a list of services that it can provide, and a priority associated with each service.

At block 920, the RM listens to other nominations. All RMs make nominations of their own servers if they can provide the service in question.

At block 930, the RM determines whether or not there is a higher priority nominee than the RM's own nominee. If the RM finds a higher priority nomination than its own, the process continues to block 940. At block 940, the RM nominates the higher priority nominee. That is, the RM adopts the highest priority nominee, and nominates that nominee in the next round.

At block 940, the RM nominates the higher priority nominee. The process then returns to block 920.

If no higher priority nomination than the RM's nomination is detected, the process continues to block 950. At block 950, the RM tests whether or not all nominations have converged to a single nominee. Because each RM adopts the highest priority nomination it finds, the nomination process converges to a single unanimous nominee with the highest available priority.

If no unanimous nominee has been determined, the process continues to block 960. At block 960, the RM renominates its nominee, and the process returns to block 920.

If a unanimous nominee has been determined, the process continues to block 970. At block 970, the unanimous nominee is elected to provide the service.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than in a restrictive sense. The present invention should not be construed as limited by such embodiments and examples, but rather construed according to the following claims.

What is claimed is:

1. A fail-over computer system comprising:
    a plurality of servers for providing a plurality of services, including a first server for providing at least a first service and a second service;
    a manager in communication with at least one server from the plurality of servers, the manager determining a priority of the servers in the event of failure of one of the servers; and
    wherein if the first server fails to provide the first service, the first service fails over to a second server of the plurality of servers and the first server continues to provide the second service.

2. The fail-over system of claim 1, wherein the second server is a highest priority server of the plurality of servers for providing the first service in the event of failure of the first server.

3. The fail-over system of claim 1, wherein a service of the plurality of services may be one of the following: an intranet web server, Oracle database, customer support software, Sybase database, internet web server, and network file serve (NFS).

4. A fail-over computer system comprising:
    a plurality of servers for providing a plurality of services, including a first server for providing at least a first service and a second service; and
    wherein if the first server fails to provide the first service, the first service fails over to a second server of the plurality of servers and the first server continues to provide the second service; and
    wherein the second service is not failed over to the second server when the first server fails to provide the first service.

5. The fail-over system of claim 1, wherein the second service is failed over to a server in the plurality of servers when the first server fails to provide the second service.

6. The fail-over system of claim 5, wherein the server to which the second service is failed over is the server which is a highest priority server of the plurality of servers for providing the second service in the event of failure of the first server.

7. The fail-over system of claim 1, further including:
    a first heartbeat network coupling together the plurality of servers, the first heartbeat network for providing an indicator of a status of each server of the plurality of servers to the plurality of servers.

8. The fail-over system of claim 7, further comprising:
    a second heartbeat network for coupling together the plurality of servers, the second heartbeat network for providing a redundant heartbeat system, such that if the first heartbeat network fails, the second heartbeat network takes over.

9. A fail-over computer system comprising:
    a plurality of servers for providing a plurality of services, including a first server for providing at least a first service and a second service; and
    wherein if the first server fails to provide the first service, the first service fails over to a second server of the plurality of servers and the first server continues to provide the second service; and
    wherein the first server includes:
        a role manager for providing communication between the plurality of servers; and
        a service manager for managing the first service.

10. A fail-over computer system comprising:
    a plurality of servers for providing a plurality of services, including a first server for providing at least a first service and a second service; and
    wherein if the first server fails to provide the first service, the first service fails over to a second server of the plurality of servers and the first server continues to provide the second service; and
    further comprising a kernel for managing service groups and to monitor members of the service groups, and ensure that only one member of any service group is in a service state.

11. The fail-over system of claim 10, wherein the kernel includes:
    a status table for indicating a status for the plurality of servers;
    an active executive for monitoring a plurality of service managers and a heartbeat manager, the active executive further for starting an instance of an understudy executive;
    the understudy executive for monitoring the active executive and promoting itself to the active executive if active executive fails;
    the heartbeat manager being coupled to a first heartbeat network and a second heartbeat network for monitoring the status of the plurality of servers; and
    a plurality of service managers coupled to the active executive for managing a plurality of service groups.

12. The fail-over computing system of claim 1, further comprising at least one client for consuming the plurality of services including the first service.

13. A method for implementing a high availability service process comprising the steps of:
    providing a plurality of servers for running a plurality of services, including a first server to provide at least a first service and a second service;
    determining if the first server fails to provide the first service;

selecting a second server from the plurality of servers to provide the first service if the first server is determined to have failed to provide the first service; and continuing to provide the second service with the first server.

14. The method of claim 13, further comprising the steps of:

determining which of the plurality of servers other than the first server has a highest priority to provide the first service in the event of failure of the first server; and electing the highest priority server as the second server to provide the first service.

15. The method of claim 13, where in a service of the plurality of services may be one of the following: an intranet web server, Oracle database, customer support software, Sybase database, internet web server, and network file server (NFS).

16. The method of claim m 13, further comprising the steps of:

determining if the first server fails to provide the second service; and initiating one of the plurality of servers other than the first server to provide the second service if the first server is determined to have failed to provide the second service.

17. The method of claim 16, further comprising the steps of:

determining which of the plurality of servers other then the first server has a highest priority to provide the second service in the event of failure of the first server; and electing the highest priority server as the one of the plurality of servers other than the first server to provide the second service.

18. The method of claim 17, where in the one of the plurality of servers other than the first server is the second server.

19. A fail-over computing system comprising:

a plurality of servers for providing a plurality of services, including a first server for providing at least a first service;

at least one client for consuming the plurality of services;

a network for connecting the client to the plurality of servers;

a manager in communication with at least one server from the plurality of servers, the manager determining the priority of the servers in the event of a failure of one of the servers; and wherein if the first server fails to provide the first service, the first service fails over to a second server of the plurality of servers, the second server of the plurality of servers being the highest priority server for providing the first service in the event of failure of the first server.

20. The fail-over computing system of claim 19, wherein the first server provides a second service and wherein if the first server fails to provide the first service and the first service fails over to the second server of the plurality of servers, the first server continues to provide the second service.

21. A fail-over computer system comprising:

a plurality of servers for providing a plurality of services, including a first server for providing at least a first service and a second service; and wherein each server of the plurality of servers can support at least one service that is originally supported by another server; and wherein if the first server fails to provide the first service, the first service fails over to a second server of the plurality of servers and the first server continues to provide the second service.

22. The fail-over computer system of claim 21, further comprising a role manager in communication with at least one server of the plurality of servers, the role manager determining which of the plurality of servers will fail over to the first server if the first server fails to provide a first service.

23. The fail-over computer system of claim 21, further comprising a manager in communication with at least one of the plurality of servers, the manager determining the priority of the servers in the event of a failure of one of the servers.

24. A fail-over computer system comprising:

three or more servers, each of the three or more servers providing at least a first service; and wherein if a first server of the three or more servers fails to provide the first service, the first service fails over to a second server from the three or more servers, the second server having the highest priority for providing the first service.

25. The fail-over computer system of claim 24, further comprising an election process that determines the highest priority server from the three or more servers.

26. The fail-over computer system of claim 24, wherein each server can support at least one service that is originally supported by another server.

27. The fail-over computer system of claim 24, further comprising a manager in communication with at least one of the plurality of servers, the manager determining the priority of the servers in the event of a failure of one of the servers.

28. The fail-over computer system of claim 24, further comprising a role manager in communication with at least one server of the plurality of servers, the role manager determining which of the plurality of servers will fail over to the first server if the first server fails to provide a service.

* * * * *

UNITED STATES PATENT AND TRADEMARK OFFICE
CERTIFICATE OF CORRECTION

PATENT NO. : 6,145,089
DATED : November 7, 2000
INVENTOR(S) : Hung Le; Gil Tene

It is certified that error appears in the above-identified patent and that said Letters Patent is hereby corrected as shown below:

<u>Column 1,</u>
Line 13, after "availability" change "in" to -- to --

<u>Column 6,</u>
Line 48, after "A" change "ser" to -- user --

<u>Column 7,</u>
Line 29, after "if the" change "selfrecovery" to -- self-recovery --

<u>Column 11,</u>
Line 18, after "claim" delete [m]
Line 34, after "claim 17" change "where in" to -- wherein --

Signed and Sealed this

Eleventh Day of December, 2001

*Attest:*

NICHOLAS P. GODICI
*Attesting Officer*     *Acting Director of the United States Patent and Trademark Office*